United States Patent
Xu et al.

(10) Patent No.: US 10,782,220 B1
(45) Date of Patent: Sep. 22, 2020

(54) CROSS-SCALE WIDE-SPECTRUM PARTICLE SIZE PLUGGING FORMULA GRANULARITY ANALYSIS METHOD

(71) Applicant: SOUTHWEST PETROLEUM UNIVERSITY, Chengdu (CN)

(72) Inventors: Cheng Yuan Xu, Chengdu (CN); Jing Yi Zhang, Chengdu (CN); Yi Li Kang, Chengdu (CN); Li Jun You, Chengdu (CN); Xiao Peng Yan, Chengdu (CN); Chao Jiang, Chengdu (CN); He Xiang Zhou, Chengdu (CN); Bin Yang, Chengdu (CN); Chuan Liu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/817,838

(22) Filed: Mar. 13, 2020

(30) Foreign Application Priority Data

May 20, 2019 (CN) .......................... 2019 1 0418464

(51) Int. Cl.
*G01N 15/02* (2006.01)
(52) U.S. Cl.
CPC .............. *G01N 15/0227* (2013.01)
(58) Field of Classification Search
CPC .................................................. G01N 15/0227
See application file for complete search history.

(56) References Cited

U.S. PATENT DOCUMENTS 6,004,455 A * 12/1999 Rendall .................. C10G 1/047
196/14.52

FOREIGN PATENT DOCUMENTS

| CA | 2650750 A1 | 7/2010 |
|---|---|---|
| CN | 103954538 A | 7/2014 |
| CN | 104089858 A | 10/2014 |
| CN | 204203039 U | 3/2015 |
| CN | 205015251 U | 2/2016 |

(Continued)

OTHER PUBLICATIONS

Zhang Luo et al "Grain Size and Shape Analysis of Beach Sediment Using Dynamic Image Analysis and Comparison with Sieving Method", Oct. 2016, pp. 11, vol. 34, No. 5, Acta Sedimentologica Sinica.

*Primary Examiner* — Tony Ko

(57) ABSTRACT

A cross-scale wide-spectrum particle size plugging formula granularity analysis method includes: performing a size classification on a plugging material of a plugging formula; obtaining a particle size distribution of the plugging material by performing procession on each particle plugging material via a laser granularity analysis method and an imaging granularity analysis method, according to difference sizes thereof; obtaining the particle size distribution of the plugging formula by a weighted summation way, according to a granularity interval and an addition of each particle plugging material. The present disclosure can solve a problem that the particle size distribution of the plugging formula across multiple-scale ranges can't be effectively obtained, and perform granularity analysis on wide-spectrum particle size plugging formula spanning a micron-grade size, a millimeter-grade size, a centimeter-grade size and above, so as to effectively evaluate sealing ability of the plugging formula and provide reference for researchers to optimize the plugging formula.

2 Claims, 4 Drawing Sheets

FIG. 1

(56) References Cited

FOREIGN PATENT DOCUMENTS

| | | | |
|---|---|---|---|
| CN | 106501137 | A | 3/2017 |
| CN | 208270376 | U | 12/2018 |
| GB | 2380955 | A | 4/2003 |

\* cited by examiner

CROSS-SCALE WIDE-SPECTRUM PARTICLE SIZE PLUGGING FORMULA GRANULARITY ANALYSIS METHOD

CROSS-REFERENCE TO RELATED APPLICATION

This application claims the benefit of priority from Chinese Patent Application No. 201910418464.7 entitled "CROSS-SCALE WIDE-SPECTRUM PARTICLE SIZE PLUGGING FORMULA GRANULARITY ANALYSIS METHOD" and filed on May 20, 2019, the content of which is hereby incorporated by reference in its entire by reference.

BACKGROUND

Technical Field

The present disclosure generally relates to a plugging formula granularity analyses field used for a drilling and completion engineering, and especially relates to a cross-scale wide-spectrum particle size plugging formula granularity analysis method.

Description of Related Art

A matching relationship between a particle size distribution of a plugging formula and a crack width can directly affect bearing pressure capacity and sealing efficiency of fractured strata. In order to achieve an optimal filling effect, particles with different sizes shall be closely matched with each other when a plugging material is needed to form a bridge plugging connection. Different types of rigid, resilient and fibrous materials are cooperative to each other to improve formation efficiency and bearing pressure capacity of a sealing layer, and more effectively protect a reservoir stratum from an erosion and harm by working fluid and other working fluid.

At present, a granularity analysis of the plugging formula is generally implemented by a laser granularity analyzer. However, a granularity range tested by the laser granularity analyzer is less than 1 mm so that the laser granularity analyzer is not suitable for plugging materials with larger particle sizes, thereby there are big limitations to use the laser granularity analyzer. Therefore, it is of great significance to design a wide-spectrum particle size plugging formula granularity analysis method, which has cross-scale sizes spanning a micron-grade size, a millimeter-grade size and a centimeter-grade size of plugging materials.

SUMMARY

The technical problems to be solved: in view of the shortcomings of the related art, the present disclosure relates to a cross-scale wide-spectrum particle size plugging formula granularity analysis method which can measure a particle size distribution of a micron-grade particle material by a laser particle size analyzer, perform a granularity analysis of a millimeter-grade, a centimeter-grade and above plugging materials by an imaging granularity analysis method, and finally, combined with test results of the two methods above, calculate the particle size distribution of the plugging formula by a weighted average way based on taking an addition of each particle plugging material within the plugging formula as a weight, so as to provide a basis for optimally designing the reservoir to protect the particle size distribution of the plugging formula.

The technical solution adopted for solving technical problems of the present disclosure is:

a cross-scale wide-spectrum particle size plugging formula granularity analysis method according to an embodiment of the present disclosure includes the following steps:

step 1: performing a size gradation and categorization on each particle plugging material of a plugging formula respectively according to a size of each particle plugging material, the size gradation including a micron-grade size, a millimeter-grade size and a centimeter-grade size;

step 2: obtaining a particle size distribution and a cumulative particle size distribution of each particle plugging material by a granularity analysis method, wherein a selection principle of the specific granularity analysis method is as follows:

performing a granularity analysis on a micron-grade plugging material by a laser granularity analysis method, according to difference sizes of the plugging material, and performing a granularity analysis on a millimeter-grade plugging material, a centimeter-grade plugging material and above by an imaging granularity analysis method;

The particle size distribution of bridging particles used in the plugging formula is wide, which includes a micron-scale size, a millimeter-scale size, a centimeter-scale size and above. However, the laser granularity analyzer is only applicable to measure the particle size distribution with a micron-scale size, so that the measurement is not accurate if the laser granularity analyzer is configured to measure the particle size distribution with a scale size larger than the micron-scale size. While, the imaging granularity analysis method can be configured to measure the particle size distribution with a millimeter-scale size and a centimeter-scale size, but the measurement can't be accurate if the imaging granularity analysis method is configured to measure the particle size distribution with a scale size less than the millimeter-scale size. In this way, the laser granularity analysis method is combined with the imaging granularity analysis method for cooperatively measuring particles with different sizes, therefore feasibility and accuracy of the granularity analysis of the plugging materials with a micron-grade size, a millimeter-grade size, and a centimeter-grade size can be improved.

step 3: calculating the particle size distribution and the cumulative particle size distribution of plugging formula;

obtaining a frequency $a_n^i$ of each particle plugging material in a granularity interval i by the distribution of each particle plugging material obtained in the step 2; obtaining the particle size distribution of the plugging formula by formula (1) and obtaining the cumulative particle size distribution of the plugging formula by formula (2), according to an addition of each particle plugging material as a weight, the specific calculation formula shown below:

$$f(i) = \frac{a_1^i x_1 + a_2^i x_2 + \ldots + a_n^i x_n}{x_1 + x_2 + \ldots + x_n} \quad (1)$$

$$c(i) = \sum_{j=1}^{j=i} f(i) \quad (2)$$

wherein: i is the granularity interval, n is species amount of the particle plugging material, f(i) is a distribution frequency of the plugging formula within the granularity interval i, $a_n^i$ is the distribution frequency of the nth particle plugging material within the granularity interval i, $x_1$, $x_2 \ldots x_n$ is an addition of a volume ratio of the first, second . . . nth particle plugging material, c(i) is a cumulative distribution frequency of the plugging formula within the granularity interval i;

step 4: drawing a particle size distribution curve of the plugging formula, according to the particle size distribution and the cumulative particle size distribution of the plugging formula obtained in the step 3.

When the particle size distribution of one kind of particle plugging material is wide, with more than one classification, such as both millimeter-grade particles and micron-grade particles, the method of the present disclosure can also be used to calculate the particle size distribution and the cumulative particle size distribution of the particle plugging material after screening classifications of the particle plugging material. The specific steps are as follows: screens with different pore sizes are firstly selected to sift the particle plugging material and obtain additions, and then, according to the step 1, performing a size gradation and categorization on each particle plugging material according to its particle size, obtaining the particle size distribution of such kind of particle plugging material according to the step 2, and obtaining the particle size distribution and the cumulative particle size distribution of such kind of particle plugging material according to the step 3.

An imaging granularity analysis method of the present disclosure is also provided and includes the following steps:

step S1: dispersedly spreading out experimental samples on a paper with a high color compared with a color of the experimental samples, every two adjacent particles separated from each other without mutual contact during spreading out the experimental samples, and the number of particle samples not less than four hundred;

step S2: performing an imaging operation on the experimental samples by using a high definition camera, a standard ruler with a clear scale being placed next to the material during the imaging operation;

step S3: performing an image procession on an image captured in the step S2 by software, the image procession including an image denoising procession, an image enhancement procession, a threshold selection procession, an image binarization procession and an image edge detection procession, and obtaining an individual particle size of the sample according to a final obtained image sample; and step S4: after obtaining the particle size of each particle, calculating a number of particles in each particle size range according to the image obtained in the step 3, and calculating the number of the particles in each size range as a percentage of a total number of the particles, so as to obtain the particle size distribution and the cumulative particle size distribution of the plugging material.

Compared with the related art, the present disclosure provides the advantages as below.

(1) By combining the laser granularity analysis method with the imaging granularity analysis method, the present disclosure can solve the problems that the particle size distribution of bridging particles used in the plugging formula is relatively wide so that an applicability of a single granularity analysis method is poor to obtain distortion analysis results, and can further improve the accuracy of the granularity analysis of the plugging material spanning a micron-grade size, a millimeter-grade size and a centimeter-grade size.

(2) By establishing a cross-scale wide-spectrum particle size plugging formula granularity analysis method, the present disclosure can analyze the particle size distribution of bridging particles of the plugging formula, and efficiency of a sealing layer formed by the plugging formula before a site construction, so as to effectively evaluate sealing ability of the plugging formula and provide reference for researchers to optimize the plugging formula.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

A first embodiment of the present disclosure:

a composition and an addition of a particle plugging material in the plugging formula are as follows: 3% $A_1$+1% $A_2$+3% $A_3$+3% $A_4$;

a particle plugging material $A_1$, an addition of a mass to volume ratio is 3% (3 g/100 ml), converted to an addition of a volume ratio is 3%/$\rho_{A1}$;

a particle plugging material $A_2$, an addition of a mass to volume ratio is 1% (1 g/100 ml), converted to an addition of a volume ratio is 1%/$\rho_{A2}$;

a particle plugging material $A_3$, an addition of a mass to volume ratio is 3% (3 g/100 ml), converted to an addition of a volume ratio is 3%/$\rho_{A3}$;

a particle plugging material $A_4$, an addition of a mass to volume ratio is 3% (3 g/100 ml), converted to an addition of a volume ratio is 3%/$\rho_{A4}$.

Figure 1:
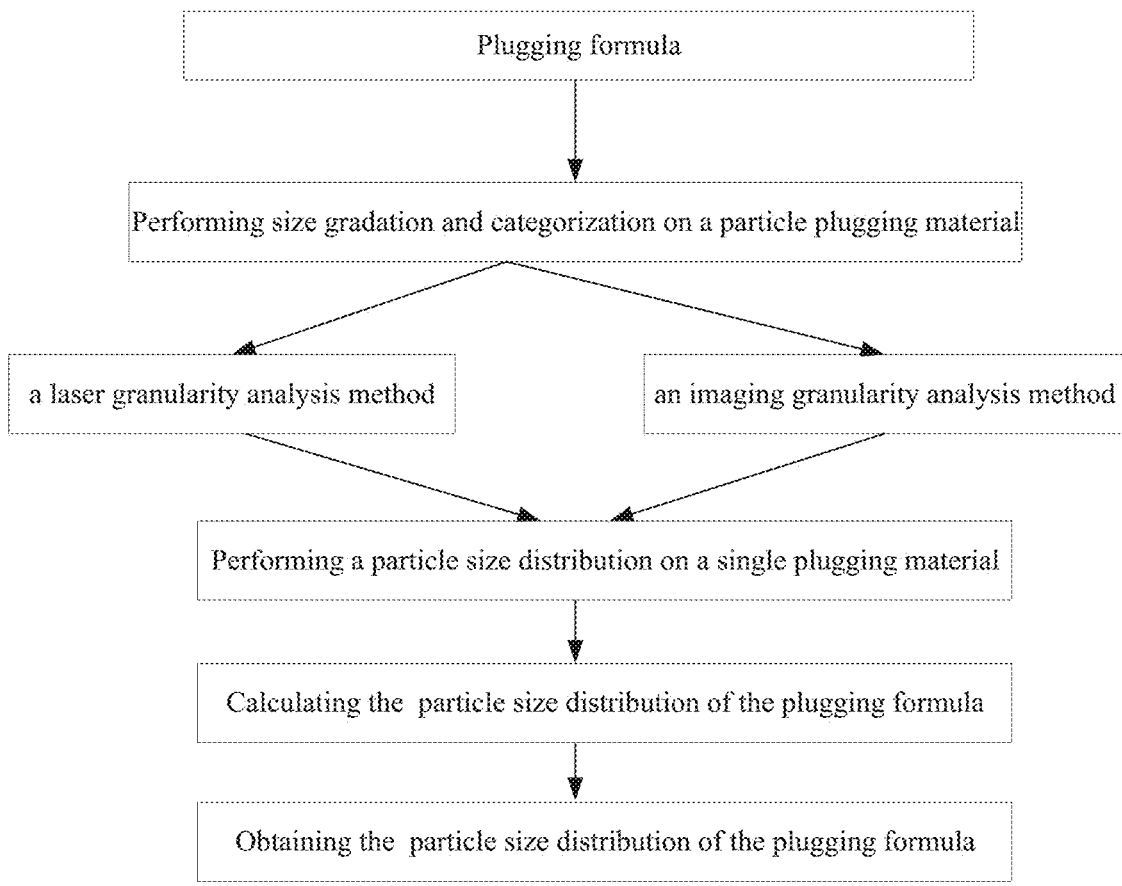
FIG. 1 is a flowchart of a cross-scale wide-spectrum particle size plugging formula granularity analysis method in accordance with an embodiment of the present disclosure.
Figure 2:
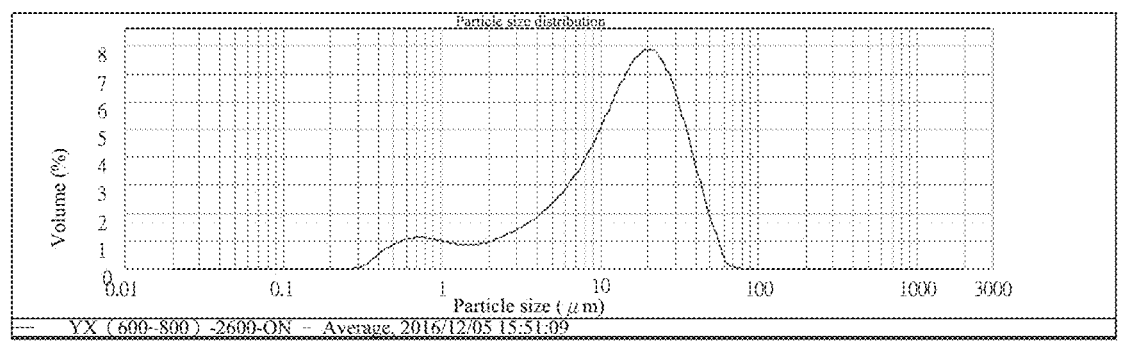
FIG. 2 is a schematic view of a particle size distribution curve of a micron-grade plugging material $A_4$.
Figure 3:
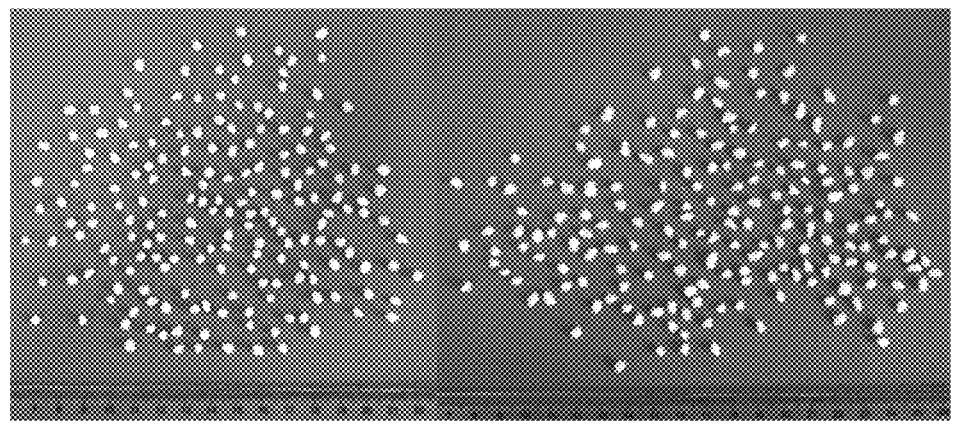
FIG. 3 is a schematic view of a high-definition image of the plugging material.
Figure 4:
FIG. 4 is a schematic view of the plugging material after being processed.
Figure 5:
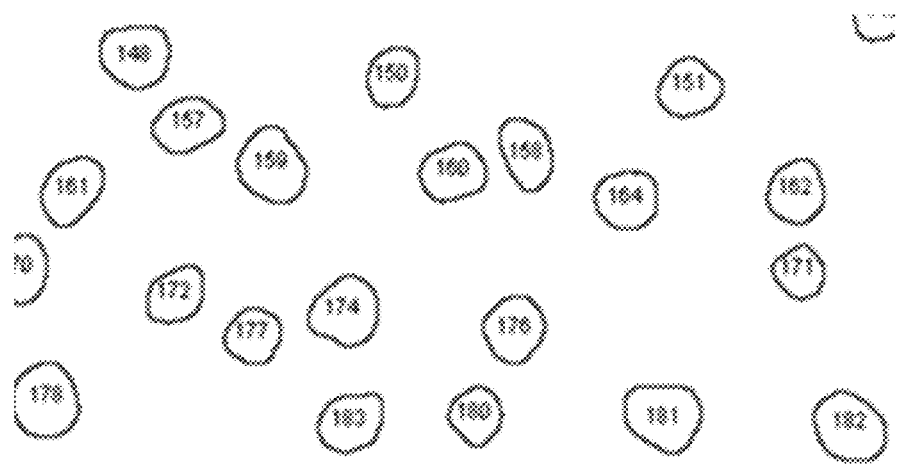
FIG. 5 is a partial enlargement schematic view of FIG. 4.
Figure 6:
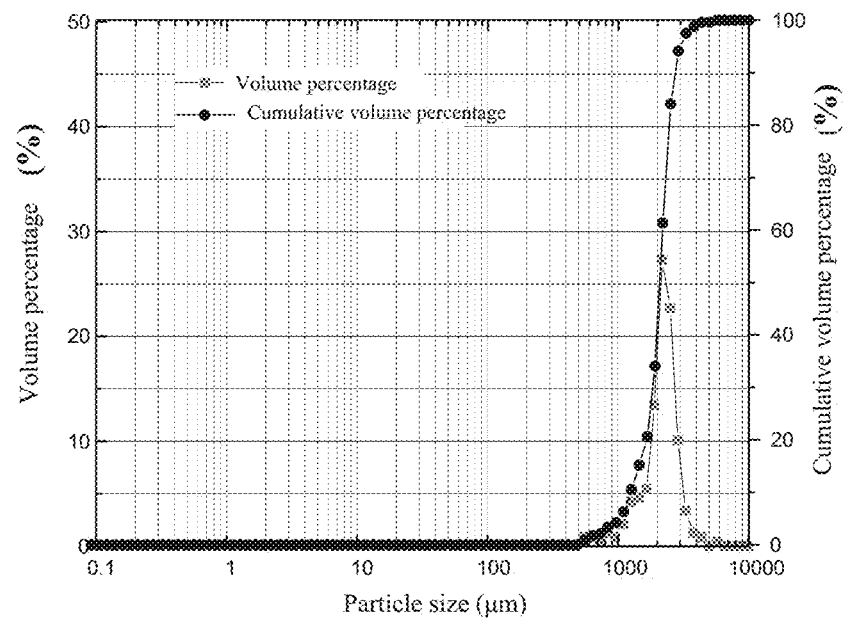
FIG. 6 is a schematic view of a particle size distribution curve of a millimeter-grade plugging material $A_2$.
Figure 7:
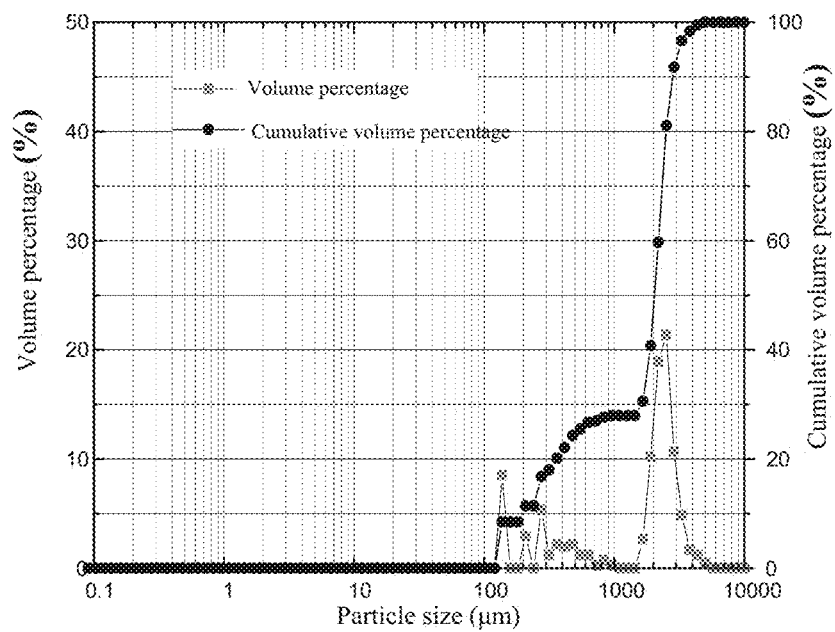
FIG. 7 is a schematic view of a particle size distribution curve of a millimeter-grade plugging material $A_3$.
Figure 8:
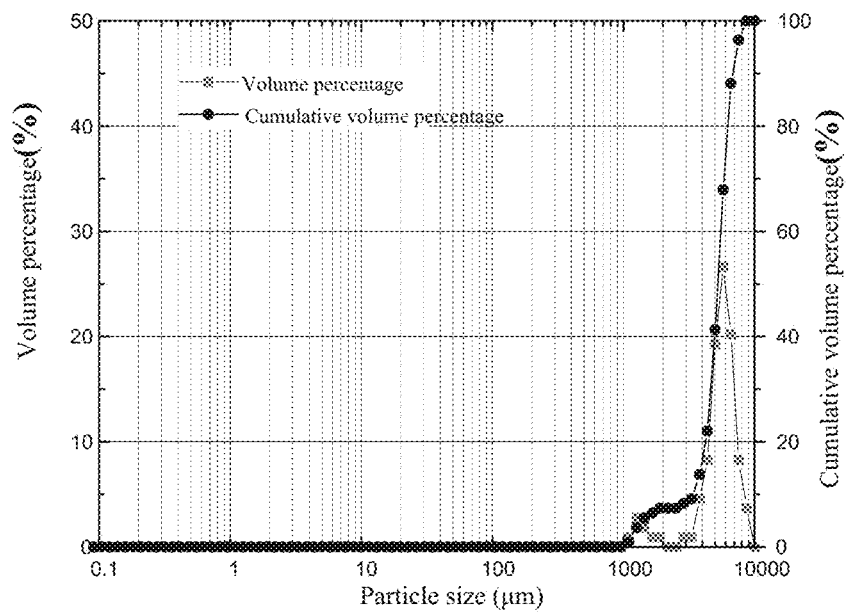
FIG. 8 is a schematic view of a particle size distribution curve of a centimeter-grade plugging material $A_1$.
Figure 9:
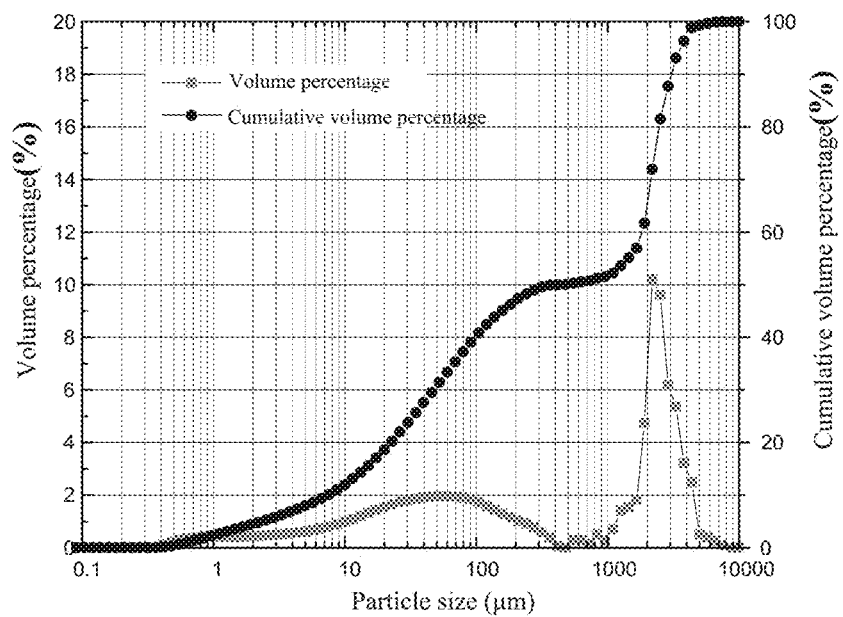
FIG. 9 is a schematic view of a particle size distribution curve of a plugging formula obtained by the present disclosure.

A cross-scale wide-spectrum particle size plugging formula granularity analysis method includes the following steps:

step 1, performing a size gradation and categorization on each particle plugging material of a plugging formula respectively according to a size of each particle plugging material, wherein the particle plugging material $A_4$ is a micron-grade size plugging material, each of the particle plugging material $A_2$ and the particle plugging material $A_3$ is a millimeter-grade size plugging material, and the particle plugging material $A_1$ is a centimeter-grade size plugging material.

step 2, obtaining a particle size distribution and a cumulative particle size distribution of each particle plugging material by a granularity analysis method;

step (1), referring to FIG. 2, performing a granularity analysis on the micron-grade plugging material $A_4$ by the laser granularity analysis method so as to obtain a particle size distribution curve of the micron-grade plugging material $A_4$.

step (2), performing a granularity analysis on a millimeter-grade plugging material $A_2$ by the imaging granularity analysis method so as to obtain a particle size distribution curve of the millimeter-grade plugging material $A_2$; the specific steps are as follows:

step ①, dispersedly spreading out experimental samples on a paper with a high color compared with a color of the experimental samples, every two adjacent particles separated from each other without mutual contact during spreading out the experimental samples, with four hundred and fifty particle samples thereon;

step ②, referring to FIG. 3, performing an imaging operation on the experimental samples by using a high definition camera, a standard ruler with a clear scale being placed next to the material during the imaging operation;

step ③, referring to FIG. 4 and FIG. 5 which is a partial enlargement schematic view of FIG. 4, performing an image procession on an image captured in the step 2 by software, the image procession including an image denoising procession, an image enhancement procession, a threshold selection procession, an image binarization procession and an image edge detection procession, and obtaining an individual particle size of the sample according to a final obtained image sample;

step ④, referring to FIG. 6, after obtaining the particle size of each particle, calculating a number of particles in each particle size range according to the image obtained in the step ③, and calculating the number of the particles in each size range as a percentage of a total number of the particles, so as to obtain the particle size distribution and the cumulative particle size distribution of the plugging material.

step (3), referring to FIG. 7, performing a granularity analysis on the millimeter-grade plugging material $A_3$, according to the step of the particle size analysis of the millimeter-grade plugging material $A_2$, so as to obtain a particle size distribution curve of the micron-grade plugging material $A_3$;

step (4), referring to FIG. 8, performing a granularity analysis on the centimeter-grade plugging material $A_1$, according to the step of the particle size analysis of the millimeter-grade plugging material $A_2$, so as to obtain a particle size distribution curve of the micron-grade plugging material $A_1$.

step 3, according to the particle size distribution of each plugging material, taking an addition of each particle plugging material as a weight, calculating, by a weighted summation method, the particle size distribution and the cumulative particle size distribution in each granularity interval of the plugging formula, the specific calculation formulas shown below:

$$f(i) = \frac{a_1^i x_1 + a_2^i x_2 + \ldots + a_n^i x_n}{x_1 + x_2 + \ldots + x_n} \quad (1)$$

$$c(i) = \sum_{j=1}^{j=i} f(i) \quad (2)$$

wherein: i is the granularity interval, n is species amount of the particle plugging material, f(i) is a distribution frequency of the plugging formula within the granularity interval i, $a_n^i$ is the distribution frequency of the nth particle plugging material within the granularity interval i, $x_1$, $x_2$ . . . $x_n$ is an addition of a volume ratio of the first, second . . . nth particle plugging material, c(i) is a cumulative distribution frequency of the plugging formula within the granularity interval i;

step 4, referring to FIG. 6, drawing a particle size distribution curve of the plugging formula, according to the particle size distribution and the cumulative particle size distribution of the plugging formula obtained in the step 3.

The method of the present disclosure can be configured to analyze the particle size distribution of the wide-spectrum particle size plugging formula spanning a micron-grade plugging formula, a millimeter-grade plugging formula and a centimeter-grade plugging formula. Compared with a conventional plugging material granularity analysis method, the method of the present disclosure can be used widely with a simple experimental operation and low cost, and more suitably provide reference for researchers to optimize the plugging formula.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A cross-scale wide-spectrum particle size plugging formula granularity analysis method comprising:
   step 1: performing a size gradation and categorization on each particle plugging material of a plugging formula respectively according to a size of each particle plugging material, the size gradation including a micron-grade size, a millimeter-grade size and a centimeter-grade size;
   step 2: obtaining a particle size distribution and a cumulative particle size distribution of each particle plugging material by a granularity analysis method, wherein a selection principle of the specific granularity analysis method is as follows:
   performing a granularity analysis on a micron-grade plugging material by a laser granularity analysis method, according to difference sizes of the plugging material, and performing a granularity analysis on a millimeter-grade plugging material, a centimeter-grade plugging material and above by an imaging granularity analysis method;
   step 3: calculating the particle size distribution and the cumulative particle size distribution of plugging formula;
   obtaining a frequency $a_n^i$ of each particle plugging material in a granularity interval i by the distribution of each particle plugging material obtained in the step 2; obtaining the particle size distribution of the plugging formula by formula (1) and obtaining the cumulative particle size distribution of the plugging formula by formula (2), according to an addition of each particle plugging material as a weight, the specific calculation formula shown below:

$$f(i) = \frac{a_1^i x_1 + a_2^i x_2 + \ldots + a_n^i x_n}{x_1 + x_2 + \ldots + x_n} \quad (1)$$

$$c(i) = \sum_{j=1}^{j=i} f(i) \quad (2)$$

wherein: i is the granularity interval, n is species amount of the particle plugging material, f(i) is a distribution frequency of the plugging formula within the granularity interval i, $a_n^i$ is the distribution frequency of the nth particle plugging material within the granularity interval i, $x_1$, $x_2$ ... $x_n$ is an addition of a volume ratio of the first, second ... nth particle plugging material, c(i) is a cumulative distribution frequency of the plugging formula within the granularity interval i;

step 4: drawing a particle size distribution curve of the plugging formula, according to the particle size distribution and the cumulative particle size distribution of the plugging formula obtained in the step 3.

2. The cross-scale wide-spectrum particle size plugging formula granularity analysis method as claimed in claim 1, wherein the imaging granularity analysis method comprises:

step S1: dispersedly spreading out experimental samples on a paper with a high color compared with a color of the experimental samples, every two adjacent particles separated from each other without mutual contact during spreading out the experimental samples, and the number of particle samples not less than four hundred;

step S2: performing an imaging operation on the experimental samples by using a high definition camera, a standard ruler with a clear scale being placed next to the material during the imaging operation;

step S3: performing an image procession on an image captured in the step S2 by software, the image procession comprising an image denoising procession, an image enhancement procession, a threshold selection procession, an image binarization procession and an image edge detection procession, and obtaining an individual particle size of the sample according to a final obtained image sample; and step S4: after obtaining the particle size of each particle, calculating a number of particles in each particle size range according to the image obtained in the step 3, and calculating the number of the particles in each size range as a percentage of a total number of the particles, so as to obtain the particle size distribution and the cumulative particle size distribution of the plugging material.

\* \* \* \* \*